United States Patent [19]

Malcolm

[11] Patent Number: 5,913,034

[45] Date of Patent: *Jun. 15, 1999

[54] ADMINISTRATOR STATION FOR A COMPUTER SYSTEM

[75] Inventor: Tom R. Malcolm, Magnolia, Tex.

[73] Assignee: Compaq Computer Corp., Houston, Tex.

[ * ] Notice: This patent is subject to a terminal disclaimer.

[21] Appl. No.: 08/709,208

[22] Filed: Aug. 27, 1996

[51] Int. Cl.$^6$ ...................................................... G06F 17/00
[52] U.S. Cl. ...................................................... 395/200.53
[58] Field of Search ........................ 395/200.53, 200.54, 395/200.55, 200.56, 200.59, 200.5, 200.51, 200.8, 311, 312, 828, 830, 835, 893; 370/254, 257, 908, 901; 340/825.06, 825.07, 825.22, 825.69, 825.72; 361/679, 680, 681, 692, 724; 312/126–130, 294, 223.2, 330.1, 319.5, 319.8, 257.1, 281, 223.1

[56] References Cited

U.S. PATENT DOCUMENTS

| 3,880,345 | 4/1975 | Becker et al. | 232/44 |
| 4,975,926 | 12/1990 | Knapp | 375/1 |
| 5,179,569 | 1/1993 | Sawyer | 375/1 |
| 5,218,356 | 6/1993 | Knapp | 342/350 |
| 5,355,149 | 10/1994 | Casebolt | 345/175 |
| 5,426,450 | 6/1995 | Drumm | 345/168 |
| 5,477,415 | 12/1995 | Mitcham et al. | 361/686 |

OTHER PUBLICATIONS

The Norton PCAnywhere for Windows Manual, Symantec Corporation, pp. 2–1 through 3–2, 1993.
Tab Books, The Illustrated Dictionary of Electronics, Sixth Edition, TAB Books, p. 135, 1994.
PC Magazine Compaq Advertisement, Feb. 7, 1995.
PC Magzaine Advanced Digital Systems–TV Elite Advertisement, Feb. 7, 1995.
Byte Magzaine Recortec Advertisment, May 1995.
Dictionary of Computing, Fourth Edition, OxfordUniversity Press, p. 322, 1996.

*Primary Examiner*—Ellis G. Ramirez
*Attorney, Agent, or Firm*—Ronald L. Chichester; Paul N. Katz; Frohwitter

[57] ABSTRACT

An administrator station for administering and maintaining a plurality of computer network and/or communications servers. A low profile clam-shell display and keyboard apparatus, as utilized in a portable notebook computer, is used to replace a rack mounted cathode ray tube video monitor, keyboard and cursor control devices, and an electromechanical switcher. An interface apparatus translates the video output, keyboard and mouse signals of a plurality of computer servers to a format that may be communicated to the administrator station either through a physical connection or by means of wireless communications such as infrared, cellular or spread spectrum radio. When not in use, the administrator station may be stored in a low profile rack panel located in a rack cabinet having a plurality of computer servers mounted therein. Alternatively, the administrator station may be moved from one rack cabinet of computer servers to another. The administrator station may also be comprised of a standard computer, either portable or desk top, and use a wireless or wired communication means adapted to communicate with a plurality of computer servers in different locations.

57 Claims, 11 Drawing Sheets

ADMINISTRATOR STATION FOR A COMPUTER SYSTEM

BACKGROUND OF THE INVENTION

1. Field of the Invention

The present invention relates to computer systems, and more particularly to an administrator station for the computer systems.

2. Description of the Related Technology

Computer systems became a scientific and commercial reality in the middle of the twentieth century. Large mainframe computers initially using vacuum tubes, then transistors, and finally integrated circuits were the norm in computer design for 25 or more years. Remote terminals were connected to these mainframe computers so that the computer users could be located some modest distance from the computer mainframe hardware. A smaller and less costly computer system called a "minicomputer" was developed and became very popular with the scientific community and small businesses. Remote terminals were still required if the minicomputer users wanted to access the minicomputer from different locations.

During the mid to late 1970s, computer hobbyists began experimenting with integrated circuit microprocessors which created "microcomputers." In 1982 International Business Machine (IBM) introduced a microprocessor based "personal computer" or PC for business use. Before IBM's introduction of its PC, microcomputers were mainly used by hobbyists and for some limited business uses. Several years before the IBM PC, Apple Computer had introduced its Apple II microcomputer with rudimentary word processing and spreadsheet software programs.

The IBM PC became immensely popular because it empowered individual workers with computing abilities heretofore only available on mainframe computers and minicomputers. The demand for personal computers attracted other microcomputer manufacturers and competition in the microcomputer industry became fierce. Competition quickly dropped the price of microcomputers and technological advances greatly increased their capabilities. The microcomputer became the defacto computer for personal and stand alone business use, but did not have the data storage capacity, program security and interconnectivity of the mainframe and minicomputer systems.

The aforementioned shortcomings of the personal computer changed when interconnection or "networking" of personal computers became commercially practical. In addition, the large data storage requirements and program security were solved with special purpose stand alone personal computers used as "network servers." The microprocessor based PC network server quickly became the backbone of all personal computer networks and was used extensively to implement both local area networks (LAN) and wide area networks (WAN) to link together vast networks of personal computers and their users. Present day enterprise business personal computer networks are rapidly replacing minicomputer and mainframe computer systems.

As more businesses begin to use personal computer networks and network servers, the emphasis on maintainability and up time becomes more and more important. Network servers are becoming increasingly more reliable and serviceable as dependence on business enterprise computer networks becomes more critical. Large enterprise networks require a plurality of powerful network servers that may be centrally located or spread over a number of different locations and linked together through communications servers connected to data communications circuits such as telephone, cable, microwave, satellite and the like.

Multiple network servers used for large and complex local area networks and/or communications servers handling a plurality of communications circuits may be located in a central area such as an equipment room. Typically, these multiple network and/or communications servers are mounted in rack panels or cabinets to conserve floor space, protect the equipment from physical hazards, and make servicing and administration more convenient. A video display monitor, cursor pointing device such as a mouse and a keyboard are required for maintenance and administration of a server. Each server, however, does not require a monitor, mouse and keyboard connected to it at the same time.

Typically, a rack cabinet containing a plurality of servers will have a "switcher" which is a device used to connect a monitor, mouse and keyboard to each one of servers in the rack, one server at a time. There are circuits in the switcher that connect to the video monitor output, mouse port input and keyboard input for each of the plurality of servers in the rack cabinet. A video monitor, mouse and keyboard is connected to the switcher. The switcher thus selects the server that will be connected to the video monitor, mouse and keyboard for maintenance or administration purposes.

The video monitor, mouse and keyboard may be permanently installed in the rack cabinet, or they may be mounted on a moveable cart that is rolled from one rack cabinet to another. When mounted in a full size 42U (73.5 inches) rack cabinet, the monitor, mouse and keyboard typically occupy about 30 percent of the available rack space. In a 22 U (38.5 inches) rack cabinet, almost 60 percent of the available rack space is used by the monitor, mouse and keyboard. This is a significant amount of available rack space, and requires more racks to be used than are desired. An alternative has been the cart mounted monitor, mouse and keyboard, at best an awkward compromise that still requires significant floor space for the cart.

What is needed is a completely portable and/or more space efficient maintenance and administrator's tool that may be easily and reliably connected to each of the plurality of computer servers.

OBJECTS OF THE INVENTION

It is therefore an object of the present invention to provide a reliable, easily installed, and space efficient user interface for the maintenance and administration of a plurality of computer servers.

It is a further object of the present invention to programmably select each of a plurality of servers without requiring external switches or patch panels.

It is a further object to provide a user interface that takes up minimal rack cabinet panel space.

It is a further object to provide a user interface that folds together and retracts into a low profile panel space in a rack cabinet.

It is a further object to provide an integrated monitor, cursor control device and keyboard that is adapted to interface with a plurality of servers mounted in a rack cabinet.

It is a further object of the present invention to utilize a standard portable computer as a user interface for a plurality of servers mounted in a rack cabinet.

It is a further object to connect a portable notebook computer to a plurality of servers in a rack cabinet with a hot pluggable connection.

It is a further object to connect a portable notebook computer to a plurality of servers in a rack cabinet with a bi-directional digital infrared link.

It is a further object to connect a portable notebook computer to a plurality of servers with a wireless link.

It is a further object to connect a portable notebook computer to a plurality of servers with a spread spectrum radio link.

It is a further object to connect a portable notebook computer to a plurality of servers with a cellular radio link.

It is a further object to provide an inexpensive portable computer as a user interface for a plurality of servers mounted in a rack cabinet.

It is a further object of the present invention to utilize a standard computer as a user interface for a plurality of computer servers in different locations without regard to the distance between the servers.

It is a further object to provide a retractable user interface that takes up minimal panel space in a rack cabinet containing a plurality of computer servers.

It is a further object to provide a user interface and printer supported on a retractable shelf mounted in a rack cabinet containing a plurality of computer servers.

It is a further object to provide a user interface for a plurality of computer servers mounted in a rack cabinet, the user interface having a touch screen for menu selection.

It is a further object to provide a user interface for a plurality of computer servers mounted in a rack cabinet, the user interface having voice actuation for menu selection.

It is a further object to provide a user interface for a plurality of computer servers mounted in a rack cabinet, the user interface being adapted for connection to a secondary monitor whereby the secondary monitor simultaneously displays the same information that is on the user interface display.

It is a further object to utilize a graphical user interface for selection of menus and functions to accomplish the other objects of the present invention.

SUMMARY OF THE INVENTION

The above and other objects of the present invention are satisfied, at least in part, by providing a hardware and software system hereinafter referred to as a Network Administrator Station ("NAS") with which a network systems administrator may perform network system maintenance and administration. The present invention NAS utilizes a portable computer type apparatus having an integral keyboard, flat panel display and cursor control device, hereinafter Administrator Interface Unit ("AIU"). The AIU is adapted for connection to a signal concentrator-converter and switching device, hereinafter referred to as an Interface Base Station ("IBS"), that is mounted in a rack cabinet with a plurality of computer servers. The IBS connects to a video output, cursor control port and keyboard port for each of the plurality of computer servers in the rack cabinet. A storable shelf and/or ejection-storage mechanism in the rack cabinet holds the AIU during use and also facilitates its connection to the IBS mounted in the rack. The NAS comprises the AIU and IBS in combination and, typically, needs no more than 2U of rack panel space.

Electronic switching logic and termination circuits within the IBS convert the monitor output, cursor control port, and keyboard port for a selected one of the plurality of computer servers to signals compatible with the AIU. The other ones (unselected) of the plurality of computer servers are not connected to the AIU but are properly terminated in the IBS so that possible erroneous signals on the unselected cursor control and keyboard ports do not disrupt the operation of the respective computer server. The AIU may be connected to the IBS with a hot pluggable connection as used in a portable computer docking station, ethernet, or by a wireless bi-directional digital data link such as infrared, spread spectrum radio, cellular radio and the like.

In a preferred embodiment of the present invention, a standard portable notebook computer having a hard disk, a floppy disk drive or a CD-ROM drive is utilized as the AIU. The portable computer of this embodiment of the present invention connects to the IBS as described above, and performs its intended functions under the control of software programs operating with a graphical user interface ("GUI") such as WINDOWS 95 and WINDOWS NT (registered trademarks of Microsoft Corporation, Redmond, Wash.), Netware (Novell), Unix, OS-2 (IBM), and System 7 (Apple Computer). GUI Control menus on the video display of the AIU may be used to select desired functions by the network administrator or service technician. A cursor pointing device such as a mouse, track ball, glide pad, keyboard joy stick button and the like may be used to position the cursor over a list of functions in the menu, then an enter button is pushed to select the desired menu function. A touch screen may also be integrated with the AIU so that direct selection of the menu function may be done with the touch of a finger, pen, or other pointed object. Similarly, a light pen or other screen position sensor may be utilized to select a desired item from the GUI menu.

A specific menu in the present invention selects which computer server the AIU is to be connected to through the IBS. No switches are needed or desired on the IBS of the present invention. Electronic logic circuits control the monitor, cursor control and keyboard signal paths from each of the plurality of computer servers to the IBS. The IBS comprises an electronic alias of a keyboard, cursor control device and video monitor for each of the servers connected thereto. Signals from the AIU are converted in the MBS to mimic the signals that would normally be generated by a standard keyboard and cursor control device (mouse). The video signal from each server is detected and converted in the IBS to a video information signal that is then sent to the AIU. Once a computer server is selected as described above, normal maintenance and administrative functions may be performed by the technician and/or network administrator through the AIU. A GUI software feature that places all video outputs on the AIU's screen simultaneously in a cascaded or tiled form. Also, a picture-in-picture ("PIP") format is contemplated in the present invention.

In another embodiment of the present invention, a minimally configured portable notebook computer type apparatus may be utilized and configured with only the necessary components to make a functional low cost AIU. This low cost AITU comprises a video display, keyboard, cursor control device or touch screen on the video display, and software programs that may be stored in a hard disk, non-volatile random access memory, or read only memory. A connection interface such as the hot pluggable port or wireless data link as described above may be used with this embodiment of the present invention. The IBS may have a standard phone jack connection (RJ11) that is adapted to interface with a modem jack in the AIU. This allows an easy and economical connection using standard interface components readily available and usable for other purposes (modem and facsimile) by the AIU.

One IBS may be located in each rack cabinet and connected to each of the plurality of computer servers therein.

A single AIU, however, may be utilized for more than one rack cabinet server system. The AIU may be folded together and a convenient handle thereon used to carry it to a desired rack cabinet and connected to the IBS therein. It is also contemplated that a AIU may be dedicated to each rack cabinet and when not in use, the AIU neatly folds together and stows away into a recess specifically designed for it, and which requires only minimal vertical rack panel space. Typically, the rack panel space required by the AIU may be 2U or approximately three inches. This is a significant savings in panel space over the prior art cathode ray tube ("CRT") video display, mouse and keyboard mounted in the prior art rack cabinet.

A slide out tray may also be incorporated with the storage means for the AIU so that a writing surface and space to place a small printer on is available. The present invention may be configured to define the writing surface for either a left or right handed user. The slide out tray may be spring loaded so that when the AIU is pushed back into the rack panel, the spring is charged. When the AIU is to be used, a release mechanism releases the slide out tray and the charged spring urges the AIU out of the rack panel to its extended operating position. Electric motor, hydraulic, or pneumatic actuators are also contemplated and within the scope of the present invention. The printer may be connected to a parallel port of the AIU, may be connected by a wireless link as described hereinabove, or via a network connection such as ethernet.

Another embodiment of the present invention uses a wireless radio connection between the AIU and a plurality of IBSs located in a plurality of rack cabinets. Using cellular radio, spread spectrum radio and the like, the present invention may connect through the appropriate IBS to any one of the plurality of computer servers located within the immediate room the administrator may be in, or the AIU may connect to remote servers located in another building or geographical area. This allows unlimited tiering of servers with one AIU via the wireless link or with the network communications means such as, for example, ethernet.

An advantage of the present invention is that the AIU may be a standard portable notebook computer with applications software that makes it function as the AIU. This enables the network administrator to use the present invention for other purposes besides an AIU. Also, a spare or replacement AIU may be easily and inexpensively obtained since most any type of portable computer may be utilized in the present invention. An obsolete portable computer may be used as the AIU since the AIU software need not be as complex and computer processor/memory demanding as the newest 32 bit applications programs. In the alternative, the most inexpensive standard portable computer may be used for the AIU of the present invention.

Another advantage of the present invention is that standard components of a portable computer, i.e., LCD screen, keyboard, cursor control device, case and motherboard may be utilized to fabricate a minimal cost hardware configuration for the AIU.

Still another advantage is that the AIU may be folded together and stored away in its panel which is located in the rack cabinet. This enables a rack cabinet door to be closed when the servers therein are not being accessed by the administrator.

Yet another advantage of the present invention is that the IBS needs no user accessible switches and thus need not take up front panel space in any of the rack cabinet. The IBS may be mounted anywhere in the rack cabinet, and cabled to each of the plurality of servers and to the connection means for the AIU. Reliable solid state electronics perform all of the necessary switching and conversion functions of the IBS.

A feature of the present invention is the use of a standard portable notebook computer and applications software for the AIU.

Another feature is retracting the AIU out of the way into the rack cabinet for safe keeping.

Another feature is being able to move the AIU from one rack cabinet to another.

Another feature of the present invention is being able to switch to a specific computer server located in any one of a plurality of rack cabinets by means of a software GUI menu.

Another feature of the present invention is the use of function keys and display screen menus to turn the power on and off in the AIU.

The present invention obtains its objects and achieves its advantages and features by utilizing standard portable computer hardware and application specific software for administration and maintenance of computer servers. The small height profile of the AIU, and not needing selector switches for the IRS reduce the amount of panel space needed in a rack cabinet, thus, more network and/or communications servers may be placed in each rack cabinet. This ultimately results in fewer rack cabinets required by the computer network hardware with a commensurate reduction in the amount of floor space used.

Other and further objects, features and advantages will be apparent from the following description of presently preferred embodiments of the invention, given for the purpose of disclosure and taken in conjunction with the accompanying drawings.

DETAILED DESCRIPTION OF THE PREFERRED EMBODIMENTS

The present invention is a method, system and apparatus for maintaining and administering a plurality of computer servers mounted in rack cabinets. In the following drawings the details of preferred embodiments are schematically illustrated. Like elements in these drawings will be represented by like numbers, and similar elements will be represented by like numbers with a different lower case letter suffix.

Figure 1:
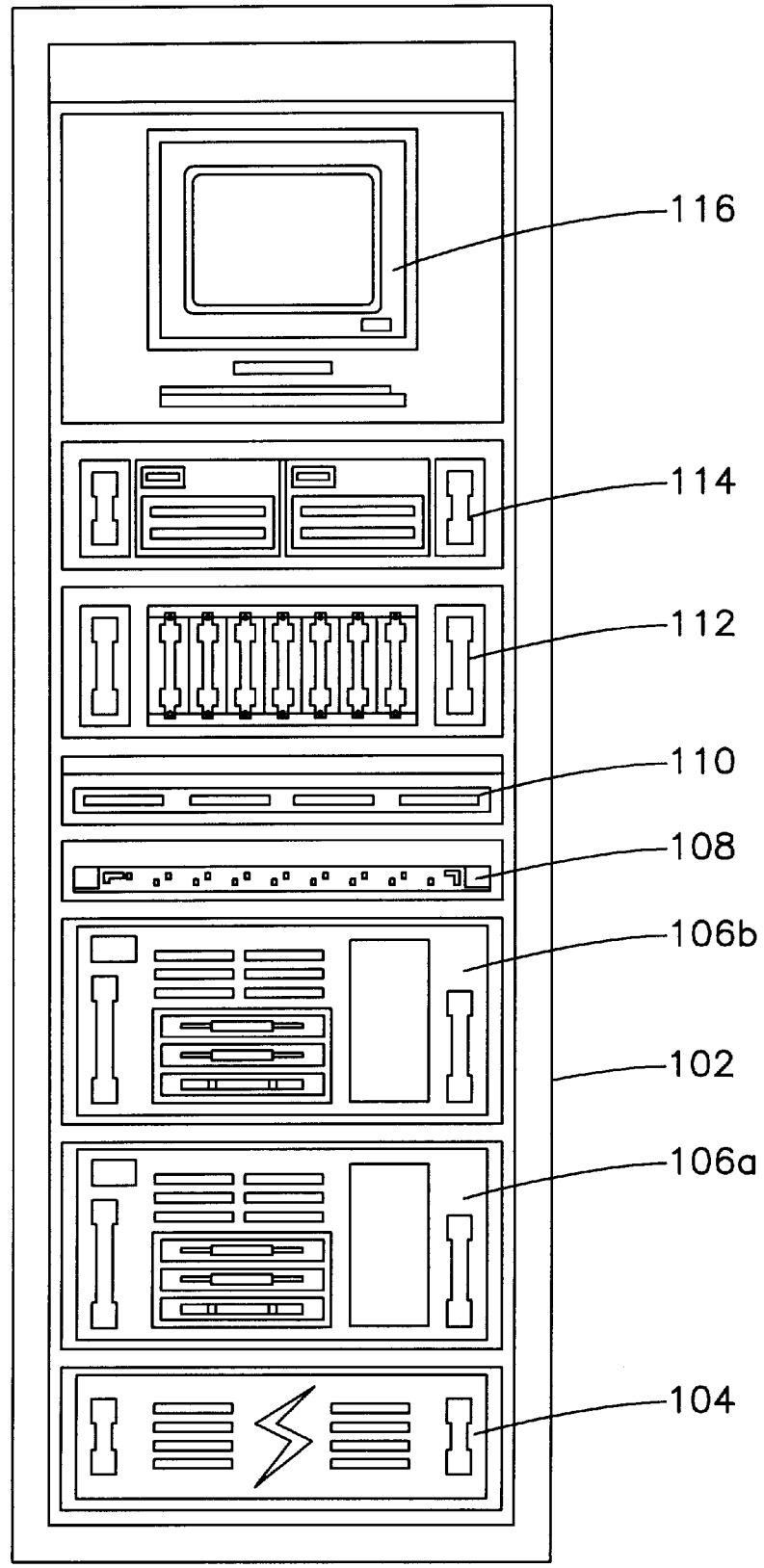
FIG. 1 is a schematic elevational view of a prior art network server rack cabinet.
Figure 2:
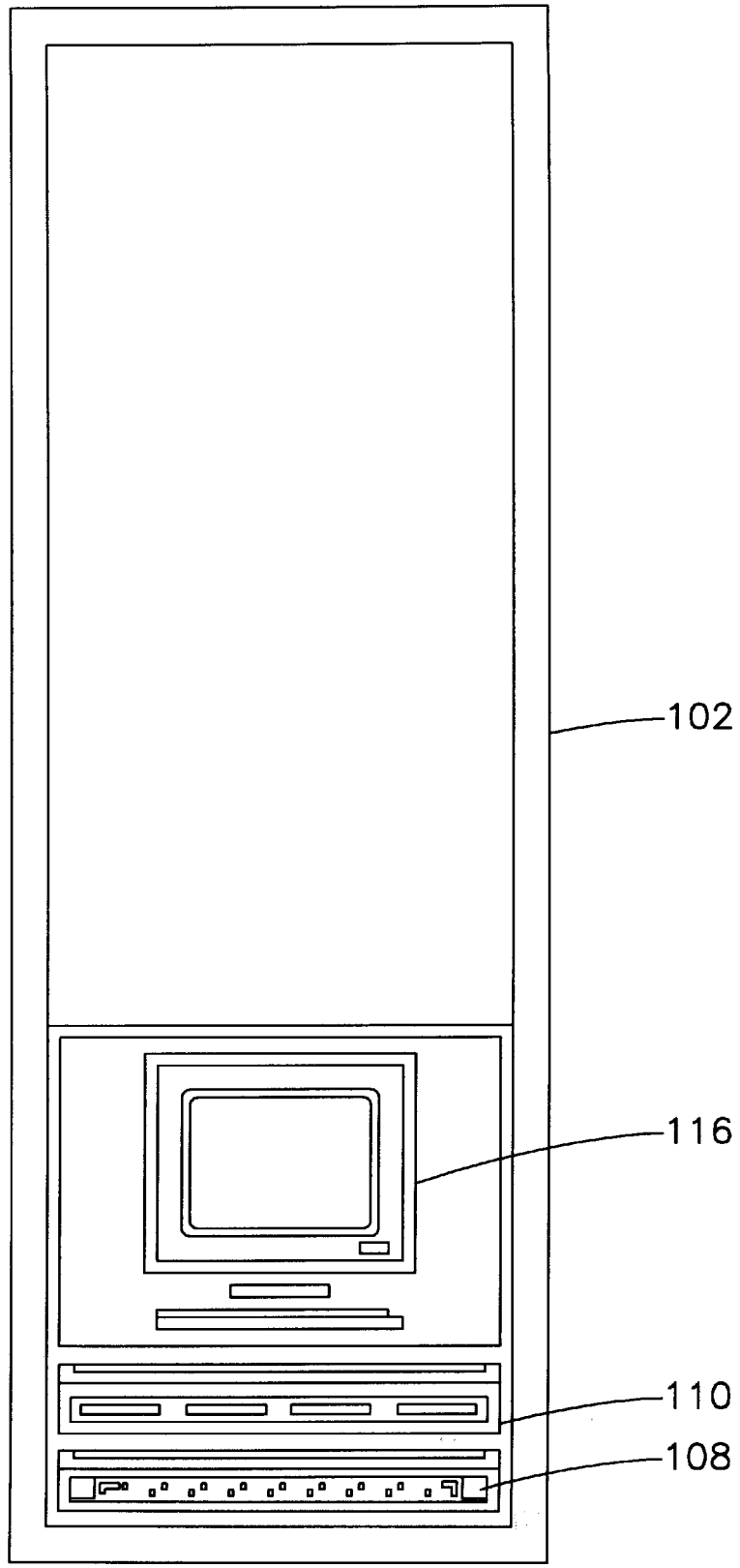
FIG. 2 is a schematic elevational view of a prior art network server interface in a rack cabinet.

Referring now to FIGS. 1 and 2, schematic elevational views of a prior art network server rack cabinet is illustrated. A rack cabinet 102 contains an uninterruptible power supply ("UPS") 104, computer network servers 106a and 106b, a keyboard 108, a switcher 110, disk storage 112, memory storage 114, and a cathode ray tube ("CRT") video monitor 116. FIG. 2 illustrates the amount of rack panel space used by the prior art keyboard 108, switcher 110 and CRT video monitor 116. The present invention eliminates the network administrator's requirement for the keyboard 108, switcher 110 and CRT video monitor 116, and the commensurate rack panel space needed.

Figure 3:
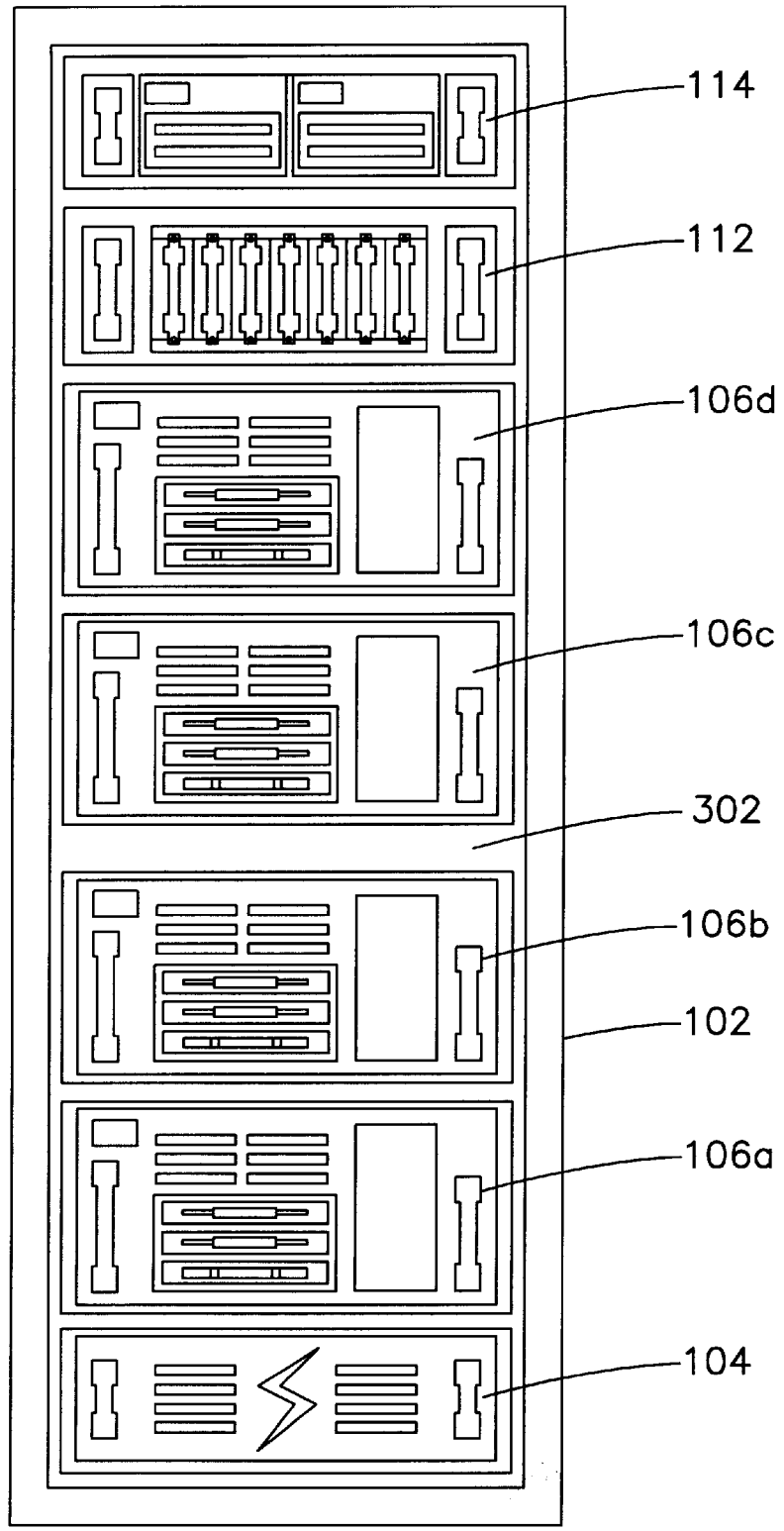
FIG. 3 is a schematic elevational view of a network server rack cabinet having an embodiment according to the present invention.
Figure 4:
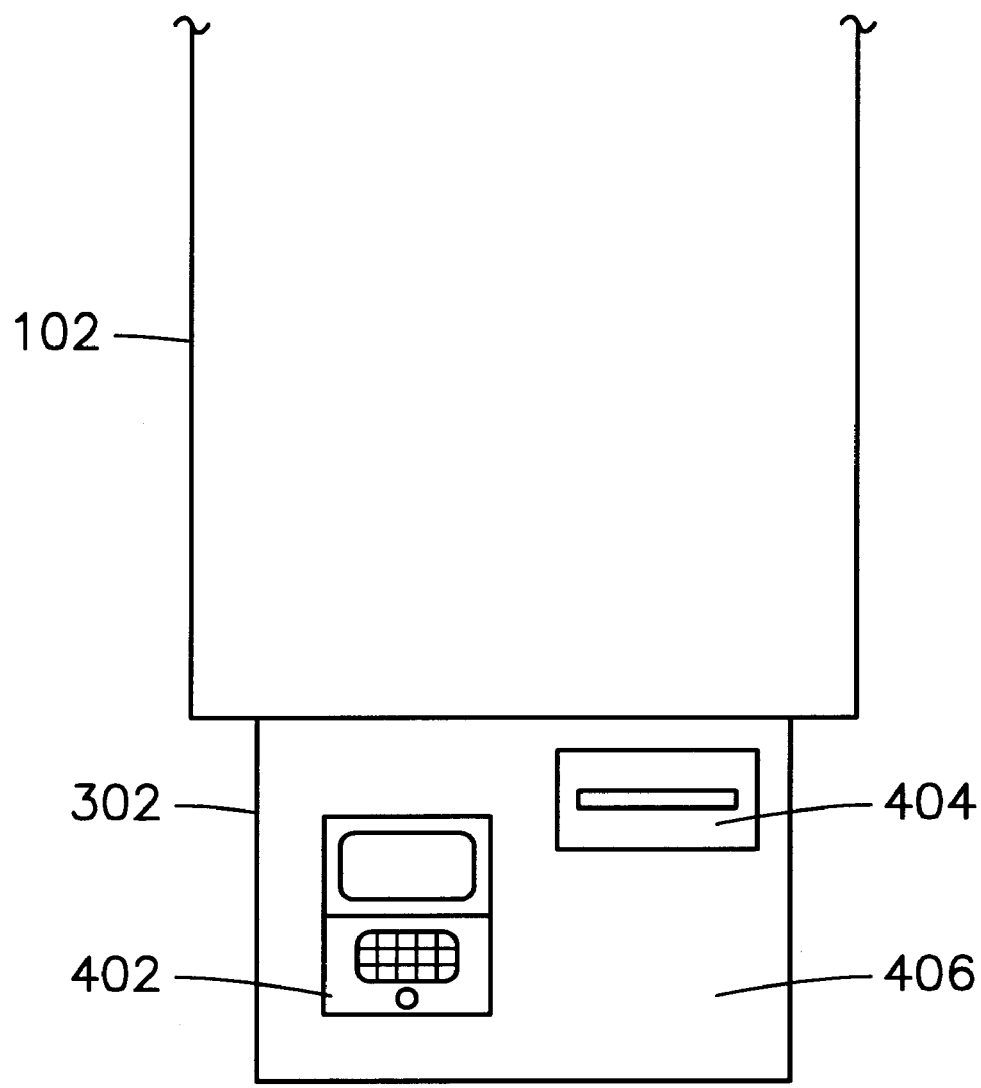
FIG. 4 is a schematic plan view of the embodiment illustrated in FIG. 3.

Referring now to FIG. 3, a schematic elevational view of a network server rack cabinet according to the present invention is illustrated. The rack cabinet 102 contains a UPS 104, computer network servers 106a–106d, disk storage 112, memory storage 114, and a retractable shelf 302. Missing from the rack 102 is the space wasting keyboard 108, switcher 110 and CRT video monitor 116. Referring to FIG. 4, a schematic plan view of the shelf 302 is illustrated. The present invention utilizes the retractable shelf 302 to support an Administrator Interface Unit ("AIU") 402 and provides for connection thereto (not illustrated). In addition, the retractable shelf 302 may also support a printer 404 and provide writing space 406 for the administrator. The writing space 406, as illustrated in FIG. 4, is for a right handed user. It is contemplated and within the scope of the present invention to arrange the AIU 402 and printer 404 where the writing space 406 is on the left hand side of the AIU 402 for a left handed user. The AIU 402 may be a portable notebook computer having a handle for ease in transportation from one rack to another. The printer 404 may also be portable. Both the AIU 402 and printer 404 may be a full featured portable computer and printer, respectively, that can be used for other functions besides network administration and maintenance. A hot docking connection or wireless connection (not illustrated) may be utilized as is well known in the art of portable computers. A printer may also be accessed through the LAN, and it is contemplated that the printer 404 may use ethernet and the like to interface with the AIU 402 and the servers 106.

Figure 5:
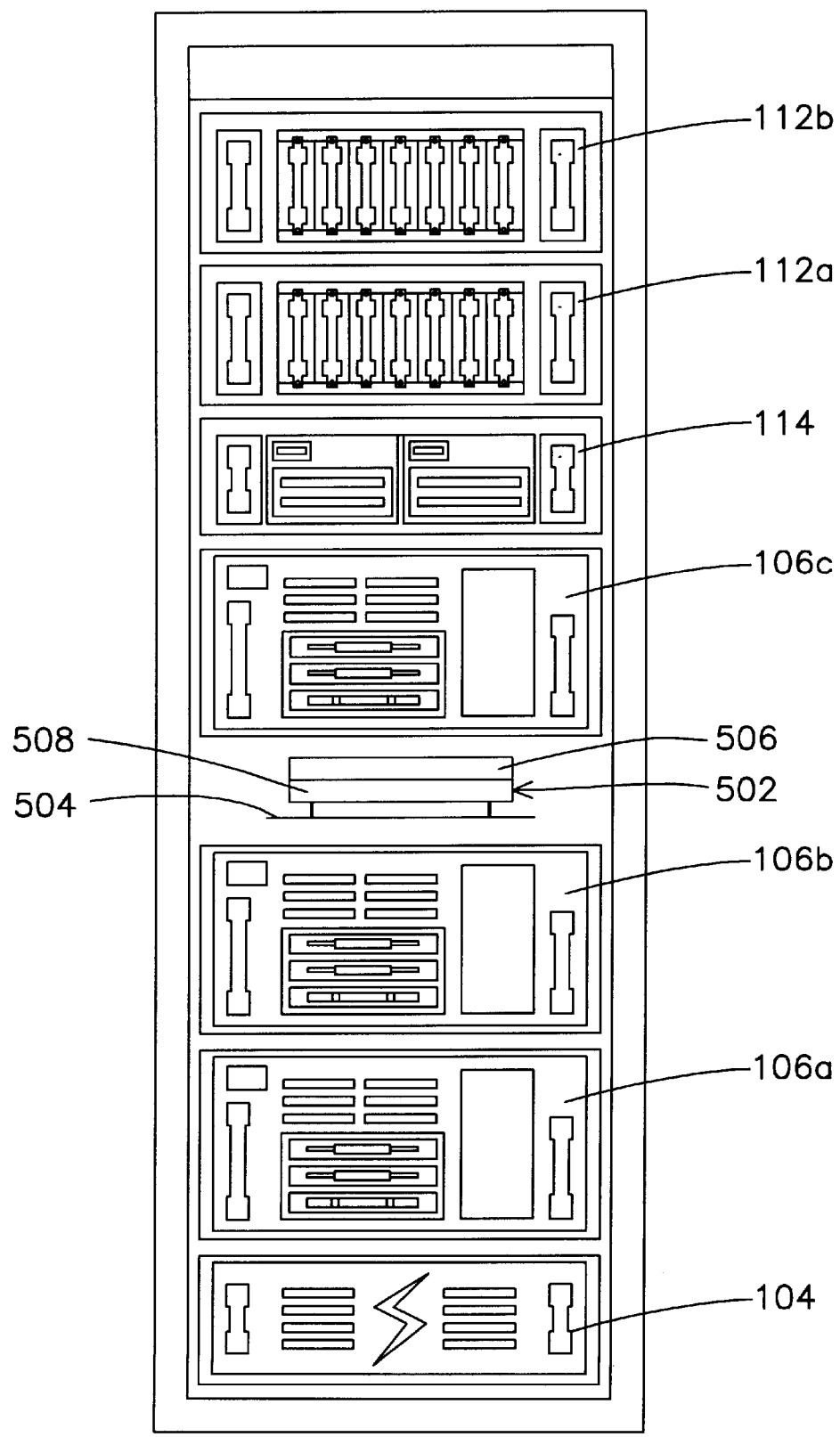
FIG. 5 is a schematic elevational view of a network server rack cabinet having another embodiment according to the present invention.

Referring now to FIG. 5, a schematic elevational view of another embodiment of the present invention is illustrated. The rack cabinet 102 contains a UPS 104, computer network servers 106a–106c, disk storage 112a and 112b, memory storage 114, and a retractable and rack storable AIU 502. The AWU 502 may be attached to retractable slides or supported on a retractable shelf 504. When the AIU 502 is at its storage position within the rack, the clam-shell graphical display 506 is folded over the keyboard 508, giving the AIU 502 a minimum height. When the AIU 502 is at its extended operating position in front of the rack, the display 506 folds up to a comfortable viewing angle and the keyboard 508 is exposed for use.

Figure 6A:
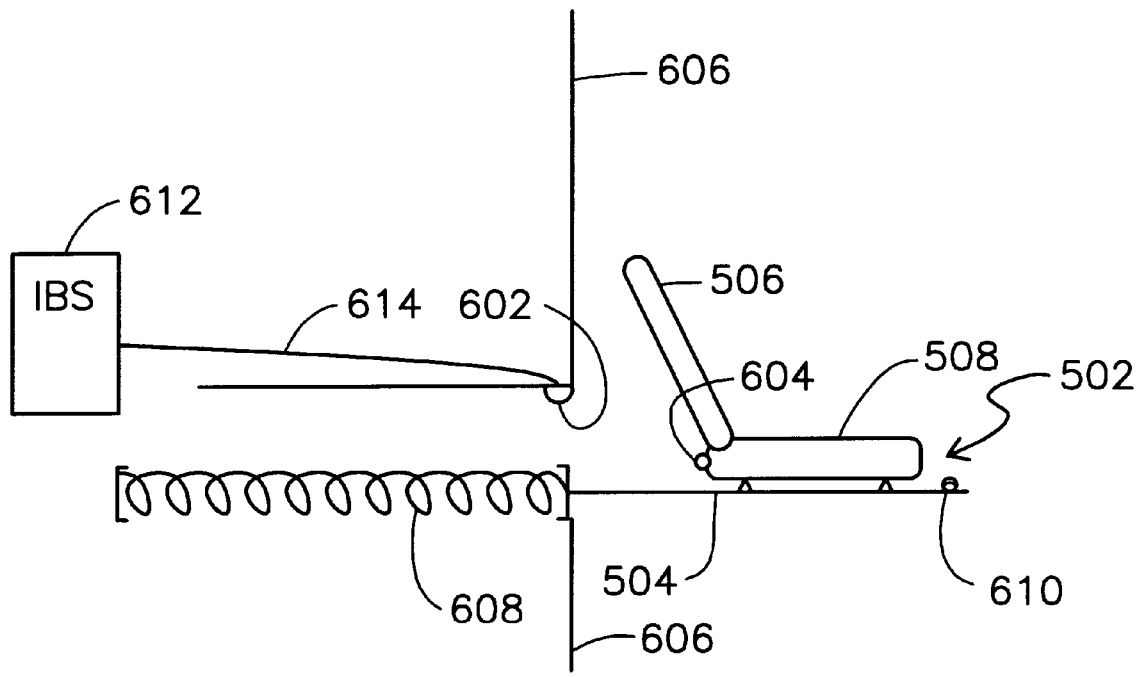
FIGS. 6A and 6B are schematic sectional elevational views of an embodiment of the present invention according to FIG. 5.
Figure 6B:
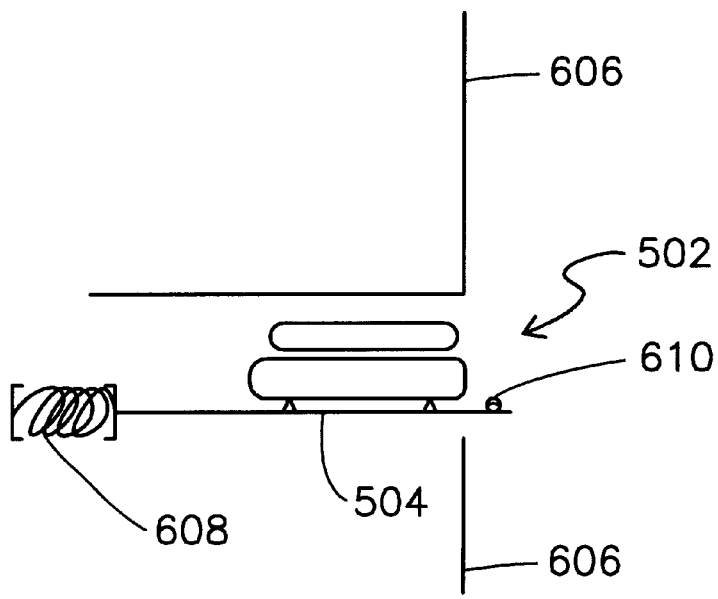

Referring now to FIGS. 6A and 6B, schematic sectional side elevational views of an embodiment of FIG. 5 is illustrated. FIG. 6A illustrates the AIU 502 in its extended operating position and FIG. 6B illustrates the AIU 502 in its retracted storage position. The AIU 502 may be attached to the retractable shelf 504 which in turn is adapted to slide in and out of the rack panel 606. Alternatively, a slide mechanism (not illustrated) on each side of the AIU 502 may be utilized in place of the retractable shelf 504. A spring 608 may be used in conjunction with the retractable shelf 504 (or slides) to urge the shelf 504 from its storage position (FIG. 6B) to its extended position (FIG. 6A). A latch mechanism (not illustrated) may be used to retain the shelf 504 in the retracted storage position, and then released when it is desired to have the shelf 504 and AIU 502 in the extended position. The spring 608 is compressed when the shelf 504 is pushed into the rack panel 606. Alternatively, The shelf 504 may have a handle 610 with which the AIU 502 may be drawn out of or pushed back into the panel 606.

An IBS 612 is connected to the video output, mouse port and keyboard port of each of the plurality of computer servers in the rack cabinet. Signals between the AIU 502 and the IBS 612 may be connected with a hot pluggable connection or by a wireless connection such as, for example, infrared data transmissions. The IBS 612 selects the server to be accessed by the AIU 502 and converts the server mouse, keyboard and display signals to a data format that may be exchanged with the AIU 502. An infrared transceiver (transmitter-receiver) 602 is connected to the IBS 612 with cable 614. Another infrared transceiver 604 is integral with the AIU 502. When transceivers 602 and 604 are positioned, as illustrated in FIGS. 6A and 7A, data and control information flow between the IBS 612 and the AIU 502.

Figure 7A:
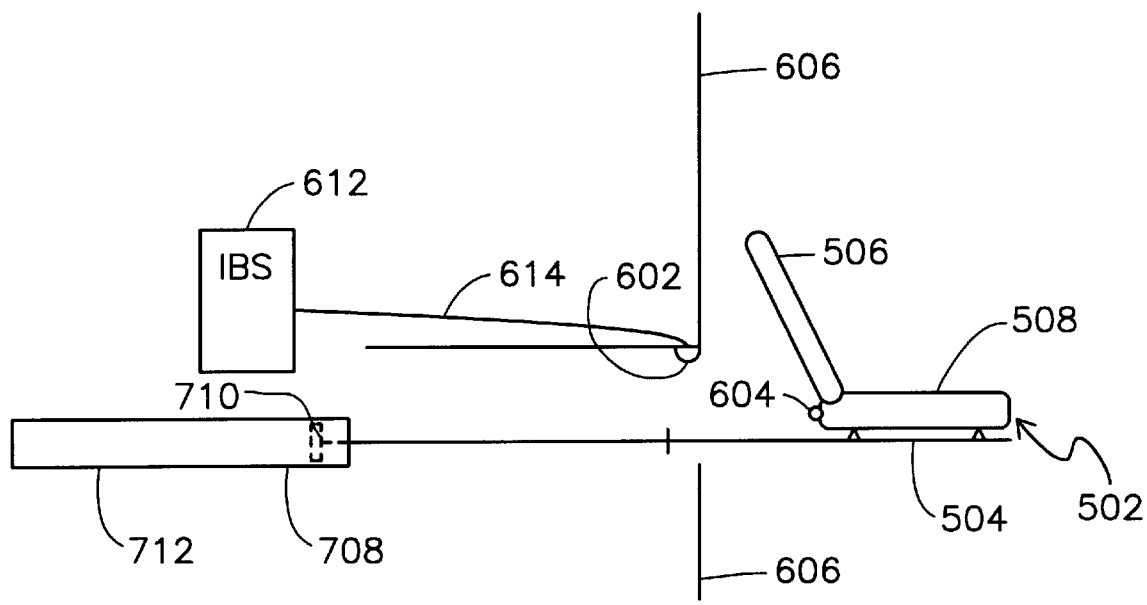
FIGS. 7A and 7B are schematic sectional elevational views of another embodiment of the present invention according to FIG. 5.
Figure 7B:
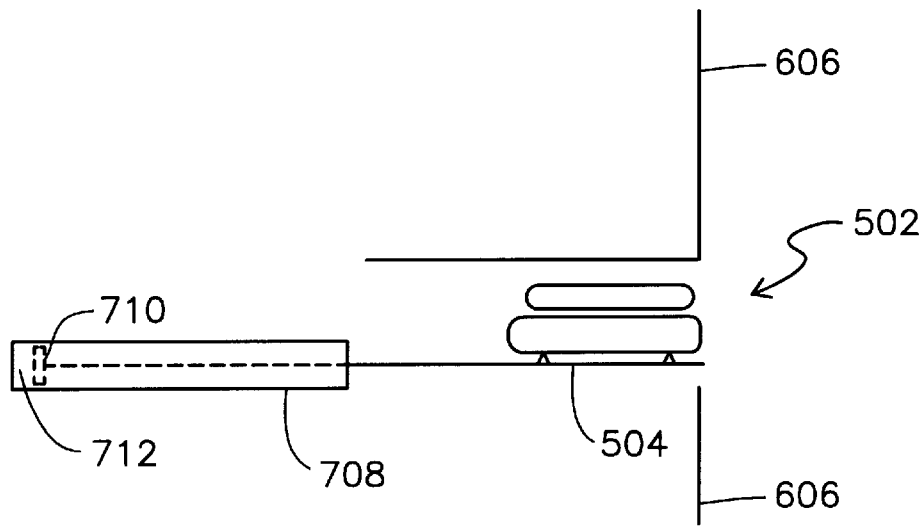

Referring now to FIGS. 7A and 7B, schematic sectional side elevational views of another embodiment of FIG. 5 is illustrated. FIG. 7A illustrates the AMU 502 in its extended operating position, and FIG. 7B illustrates the AIU 502 in its retracted storage position. The AIU 502 may be attached to the retractable shelf 504 which in turn is adapted to slide in and out of the rack panel 606. Alternatively, a slide mechanism (not illustrated) on each side of the AIU 502 may be utilized in place of the retractable shelf 504. A hydraulic or pneumatic cylinder 708 may be used in conjunction with the retractable shelf 504 (or slides) to urge the shelf 504 from its storage position (FIG. 7B) to its extended position (FIG. 7A). A latch mechanism (not illustrated) may be used to retain the shelf 504 in the retracted storage position, and then released when it is desired to have the shelf 504 and AIU 502 in the extended position. A piston 710 compresses a gas 712 in the cylinder 708 when the shelf 504 is pushed into the rack panel 606.

Figure 8A:
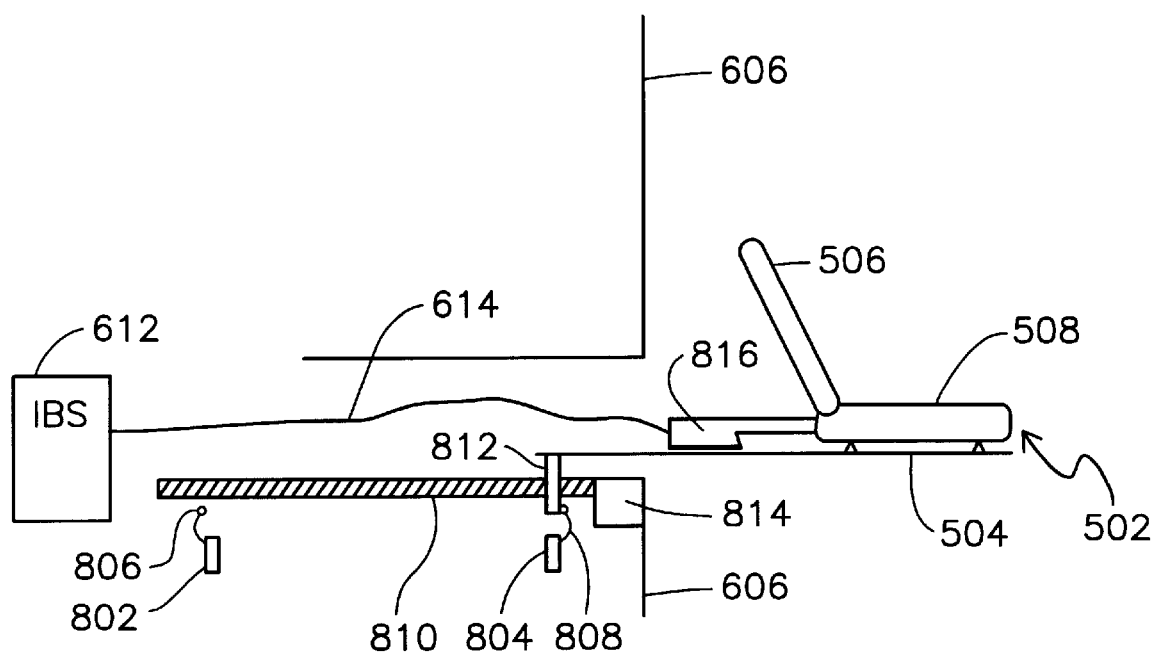
FIGS. 8A and 8B are schematic sectional elevational views of yet another embodiment of the present invention according to FIG. 5.
Figure 8B:
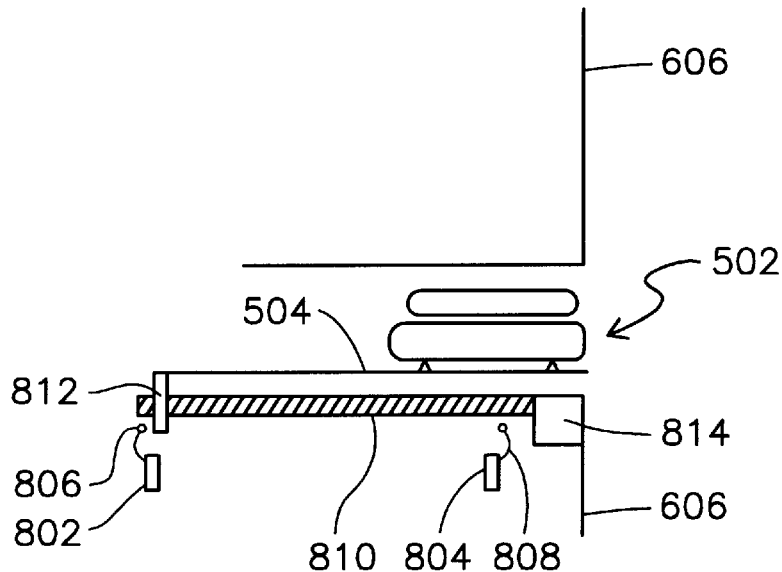

Referring now to FIGS. 8A and 8B, schematic sectional side elevational views of yet another embodiment of FIG. 5 is illustrated. FIG. 8A illustrates the AMU 502 in its extended operating position and FIG. 8B illustrates the AIU 502 in its retracted storage position. The AIU 502 may be attached to the retractable shelf 504 which in turn is adapted to slide in and out of the rack panel 606. Alternatively, a slide mechanism (not illustrated) on each side of the AIU 502 may be utilized in place of the retractable shelf 504.

A linear motion motor assembly comprising a motor 814, threaded shaft 810 and thread follower 812 may be used in conjunction with the retractable shelf 504 (or slides) to urge the shelf 504 from its storage position (FIG. 7B) to its extended position (FIG. 7A) and back to the storage position. The motor assembly is used to move the AIU 502 in to and out of the rack panel 606. The motor 814 turns in a first direction where the follower 812 attached to the shelf 504 moves the shelf 504 out from the panel 606 until the follower 812 comes into contact with a limit arm 808 which actuates limit switch 804. Switch 804 turns off the motor 814 when the shelf 504 is in its fully extended position. The motor 814 turns in a second direction (opposite to the first direction) where the follower 812, attached to the shelf 504, moves the shelf 504 in to the panel 606 until the follower 812 comes into contact with a limit arm 806 which actuates limit switch 802. Switch 802 turns off the motor 814 when the shelf 504 is in its retracted and stowed position. Any number of other types of position sensors and linear actuators may be utilized with the present invention and are contemplated herein.

A hot pluggable connection 816 may be used to connect the AIU 502 to the IBS 612 through the cable 614. The connection 816 may be any type of portable computer connection that allows the transmission of signals and power (for charging the AIU battery) between the AIU 502 and the IBS 612. The hot pluggable connection 816 allows the AIU 502 to be removed from the rack cabinet 102 and moved to another rack cabinet 102a, or the AIU 502 may be used for any function that a portable computer may perform.

Figure 9:
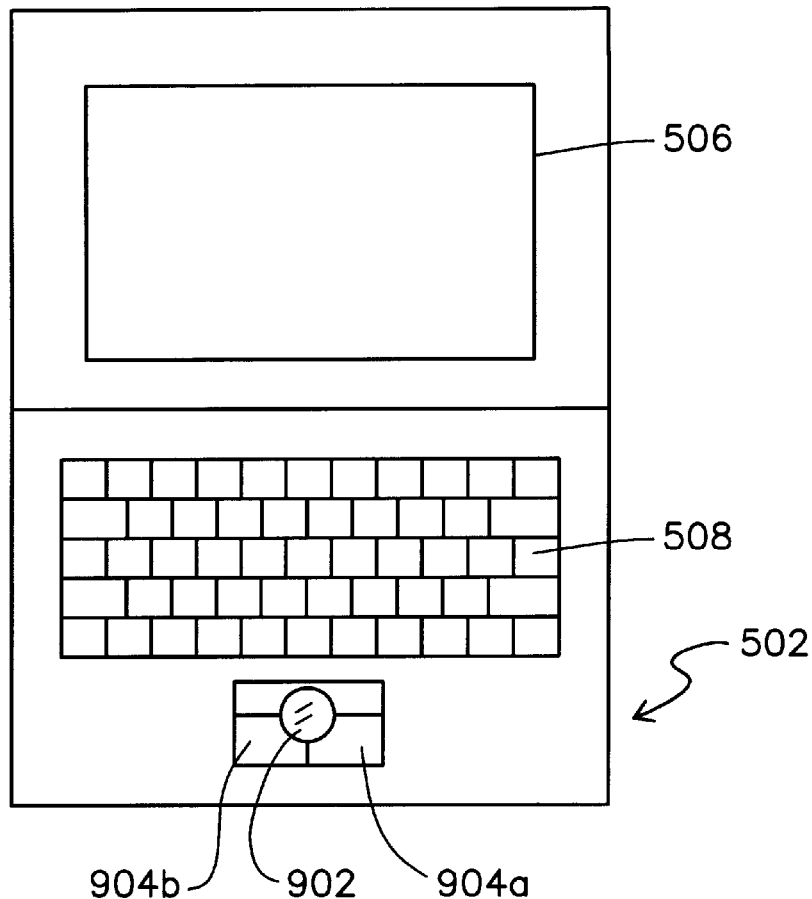
FIG. 9 is a schematic plan view of an administrator interface unit according to the present invention.

Referring to FIG. 9, the AIU 502 is illustrated in schematic plan view. The keyboard 508 is used to enter data and commands to the computer server. The display 506 is used to display information to the user. A track ball 902 is used to position a cursor in the GUI screen of display 506 for menu selection and the like. Buttons 904a and 904b (for a right or left handed user, respectively) may be used to enter commands or make selections in conjunction with the cursor in the GUI screen of the display 506. The AIU 502 may be a full function standard portable notebook computer or it may be comprised of standard parts from a portable note book computer configured as a low cost AIU to do just the functions needed by the administrator and/or technician.

The AIU 502 may be used to control all of the functions necessary to administer and/or maintain the computer servers in a rack cabinet or plurality of rack cabinets. No switcher external switches located on a front panel of the rack cabinet are necessary since the present invention performs all functions through the keyboard 508, track ball 902, buttons 904 and graphical display 506 of the AIU 502. By not needing panel space for switches or video displays greatly reduces the amount of rack panel space required, thus, more equipment may be located in each rack cabinet.

Figure 10:
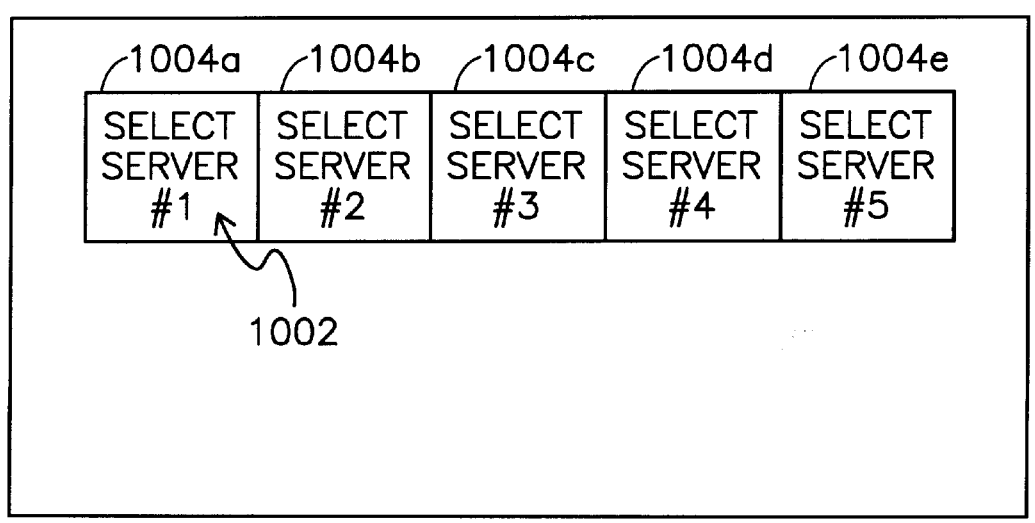
FIG. 10 is a schematic diagram of a software menu screen of the administrator interface unit of FIG. 9.

Referring to FIG. 10, a schematic diagram of a typical software menu screen on the display 506 is illustrated. A server may be selected from a GUI menu with a cursor 1002 controlled by the track ball 902. When the cursor 1002 is placed over a menu selection area 1004, the button 904 is actuated to select the function defined in the area 1004. In the example illustrated in FIG. 10, server #1 is selected by placing the cursor 102 over area 1004a, server #2 is selected by placing the cursor 102 over area 1004b, server #3 is selected by placing the cursor 102 over area 1004c, etc. Other control functions may be performed in a similar fashion and may be implemented into the present invention with the appropriate software.

Figure 11:
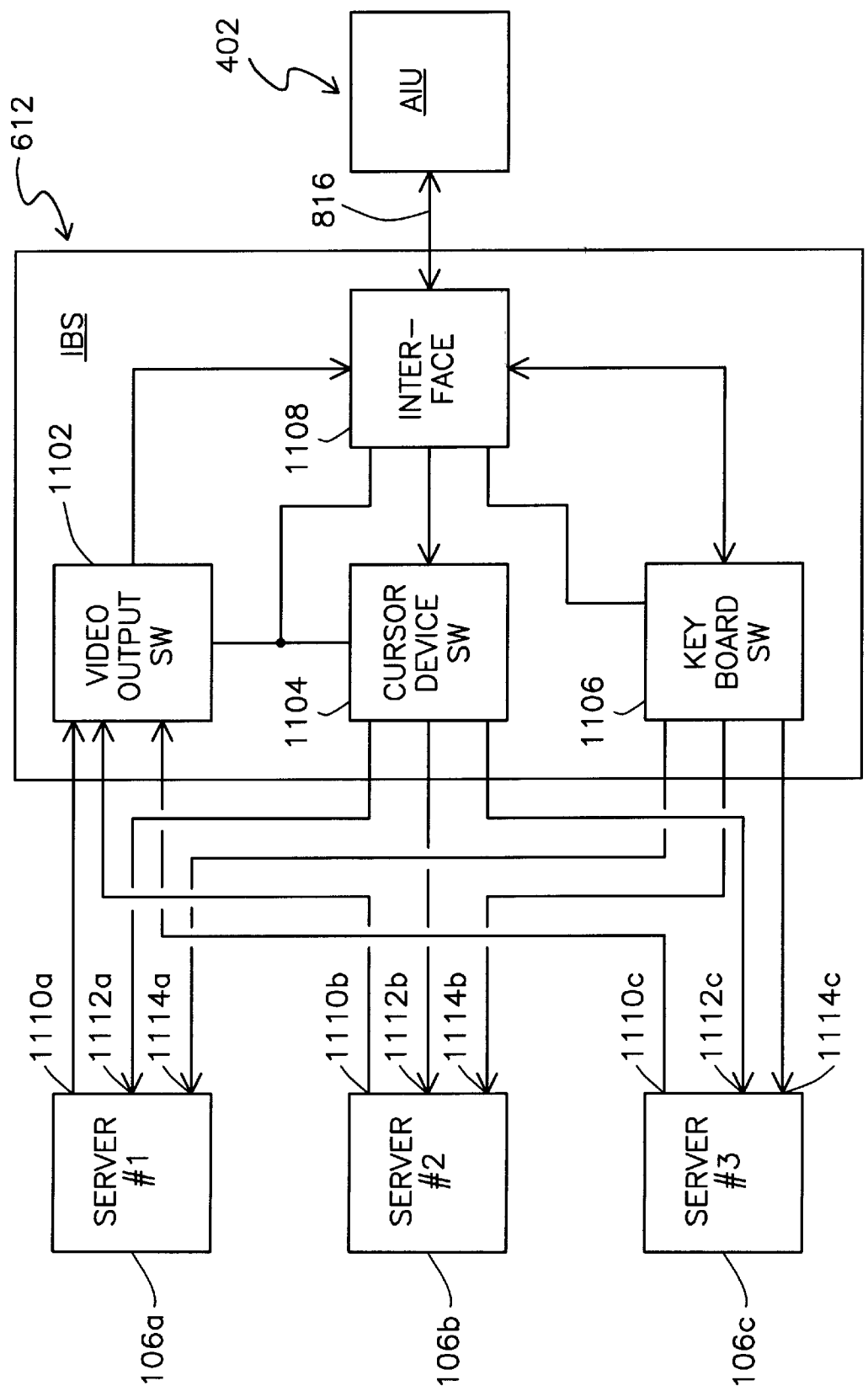
FIG. 11 is a schematic block diagram of an embodiment of the present invention.

The present invention replaces the need for the dedicated CRT video monitor 116 (FIG. 1), the keyboard 108 and the electromechanical switcher 110 for each rack cabinet of a computer server system. These components are replaced by the Network Administrator Station (NAS) which comprises the IBS 612 and the AIU 402 or 502 of the present invention. Referring now to FIG. 11, a schematic block diagram of the IBS 612 connected to the servers 106a–106c and the AIU 402 is illustrated. The IBS 612 is connected to video ports 1110a–1110c, mouse ports 1112a–1112c and keyboard ports 1114a–1114c of the servers 106a–106c, respectively. All selections are made in the IBS 612 by software commands from the AIU 402 or 502 through the menu selection process as described above and illustrated in FIG. 10.

A video output switch 1102 selects one of the video ports 1110a–1110c and sends the selected video information to interface 1108 which formats the selected video into a data stream compatible with the communications connection 816 to the AIU 402 or 502. In this way, video may be displayed on the AIU 402 for each of the servers 106a–106c. A cursor switch 1104 selects one of the mouse (cursor control) ports 1112a–1112c and connects the selected mouse port 1112 to the interface 1108. The interface 1108 translates signals from the AIU 402 or 502 into cursor control signals for the selected mouse port 1112. A keyboard switch 1106 selects one of the keyboard ports 1114a–1114c and connects the selected keyboard port 1114 to the interface 1108. The interface 1108 translates signals from the AIU 402 or 502 into keyboard signals for the selected keyboard port 1114.

The IBS 612 is comprised of electronic circuits that translate and route the various signals required by the present invention and servers connected thereto. The IBS 612 may be fabricated from application specific integrated circuits ("ASIC"), programmable array logic ("PAL") and microprocessors. The IBS 612 may be mounted out of the way in the rack cabinet since there are no external controls associated with it. The data connection 816 (illustrated as hot pluggable) may be hardwired or may be wireless as disclosed hereinabove. No front rack panel space is required for the IBS 612. Minimal rack panel space (2U) is required for the AIU 402 or 502.

The IBS 612 may also reside on the self 504 just behind the AIU 502, wherein the AIU 502 hot plugs into the IBS 612. Highly flexible flat ribbon cables from the IBS 612 to the servers 106 may be used to allow the self 504 to be easily moved without causing cable failures as is common when using round wire cords for the keyboard and mouse.

Figure 12:
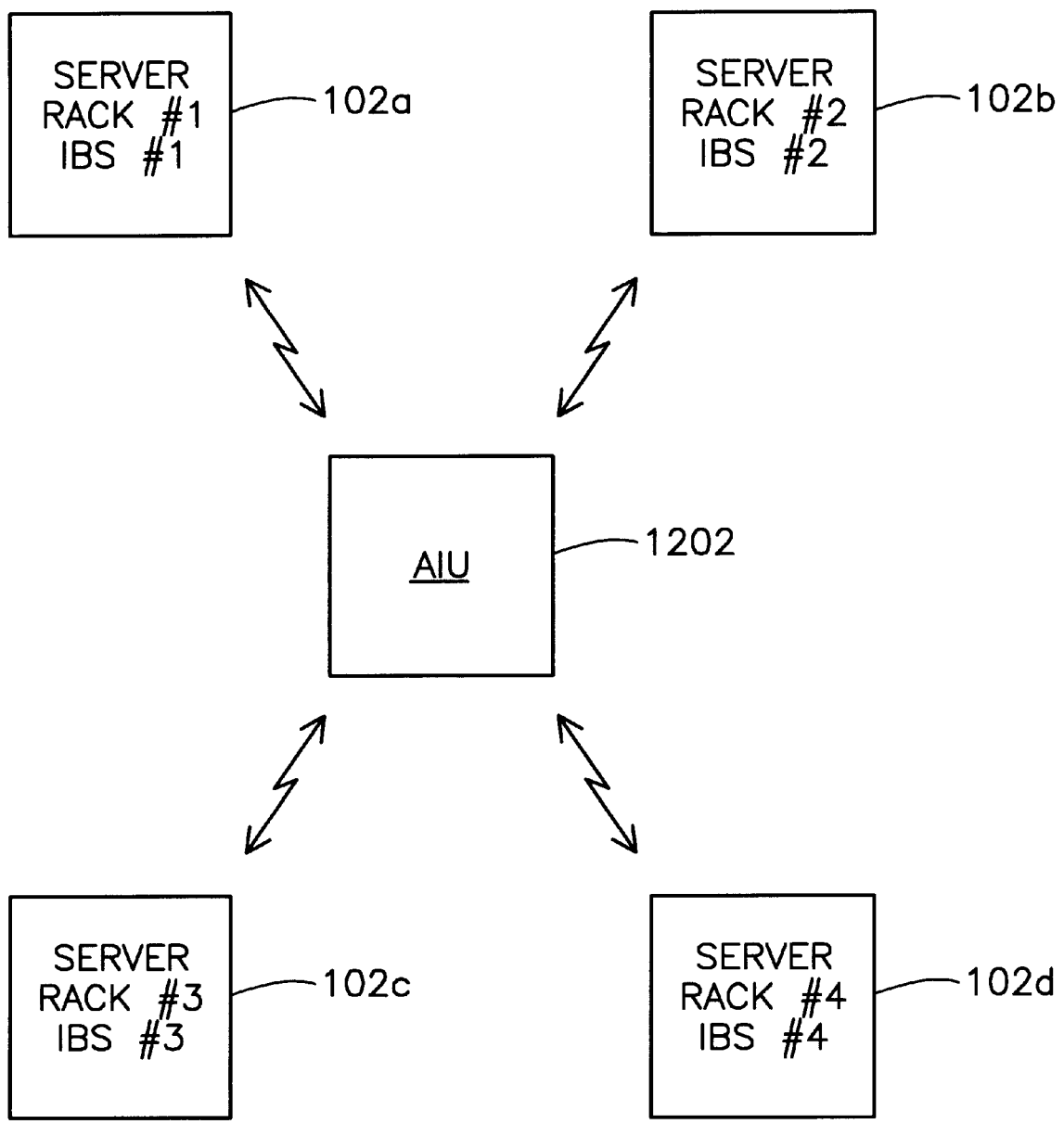
FIG. 12 is a schematic block diagram of another embodiment of the present invention.

Referring now to FIG. 12, a schematic block diagram of another embodiment of the present invention is illustrated. A wireless AIU 1202 is adapted for wireless communication with each IBS in server rack cabinets 102a–102d. The AIU 1202 may be either a portable or desk top computer. Communications between the IBSs and the AIU 1202 may be by cellular radio, spread spectrum radio, multi-frequency radio modems, digital time division multiplexed radio, infrared communications, network ethernet and the like. For example, each rack cabinet 102a–102d and IBU associated therewith could include a radio modem having a different frequency channel such as a cell or spread spectrum radio system. A central communications transceiver, at radio or infrared frequencies, could be connected to each of the IBUs in the rack cabinets 102a–102d and a time division multiplexed digital signal used between the AIU 1202 and this central communications transceiver.

The present invention is not limited to interfacing with servers at just a central location or room, but rather all forms of communication may be utilized, i.e., telephone, microwave, satellite, optical cable, ethernet and the like, to communicate with computer servers at different locations. It is contemplated and within the scope of the present invention that a standard computer, either portable or desktop, may be utilized as an administrator tool by communicating over a communications link to a plurality of computer servers located in the same location or at different locations by connecting to each of these servers' input-output ports such as, for example, the video output ports, cursor control ports and keyboard ports. An interface base unit (IBU) at each server is adapted to communicate with the aforementioned administrator tool (AIU) over a hardwired connection or wireless connection of any form described hereinabove or equivalent thereto as known to those skilled in the art of communications.

The present invention, therefore, is well adapted to carry out the objects and attain the ends and advantages mentioned, as well as others inherent therein. While presently preferred embodiments of the invention and various aspects thereto have been given for purposes of disclosure, numerous changes in the details of construction, interconnection and arrangement of parts will readily suggest themselves to those skilled in the art and which are encompassed within the spirit of the invention and the scope of the appended claims.

While the present invention has been depicted, described, and is defined by reference to particularly preferred embodiments of the invention, such references do not imply a limitation on the invention, and no such limitation is to be inferred. The invention is capable of considerable modification, alternation, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. An apparatus for administering and maintaining a plurality of computer servers, each of the plurality of computer servers having a video output, keyboard input and cursor control input, said apparatus comprising:

interface circuits having a plurality of first video inputs, a plurality of first cursor control outputs, and a plurality of first keyboard outputs, the plurality of first video inputs, first cursor control outputs and first keyboard outputs adapted for connection to a plurality of computer server video outputs, cursor control inputs and keyboard inputs, respectively;

a plurality of multiplexers connected to said interface circuits, said plurality of multiplexers comprising;

a plurality of first switches connected to the plurality of first video inputs of said interface circuits and to a first video output, wherein a switch control signal selects which one of the plurality of first video inputs is connected to the first video output;

a plurality of second switches connected to the plurality of first cursor control outputs of said interface circuits and to a first cursor control input, wherein the switch control signal selects which one of the plurality of first cursor control outputs is connected to the first cursor control input;

a plurality of third switches connected to the plurality of first keyboard outputs of said interface circuits and to a first keyboard input, wherein the switch control signal selects which one of the plurality of first keyboard outputs is connected to the first keyboard input;

a computer interface having a second video input connected to the first video output, a second cursor control output connected to the first cursor control input, a second keyboard output connected to the first keyboard input, a switch control output connected to the plurality of first, second and third switches and generating the switch control signal, and a means for communication with a computer, said computer interface translating signal information between the second video input, second cursor control output, second keyboard output, the switch control output, and the computer communication means;

a computer having a video display, a keyboard, a cursor control device and a means for communication with said computer interface;

said computer video display displaying video information received on the first video output;

said computer keyboard generating keyboard signals on the first keyboard input;

said computer cursor control device generating cursor control signals on the first cursor control input; and said computer generating the switch control signal for selecting which ones of the plurality of computer server video outputs, cursor control inputs and keyboard inputs, connected through said interface circuits and said plurality of multiplexers, are to be connected to said computer interface which is in communication with said computer.

2. The apparatus of claim 1, wherein said computer is a portable notebook computer having a keyboard and flat panel video display hinged at a common edge and folding together when not in use.

3. The apparatus of claim 1, wherein said computer is a desk top unit and the computer communication means is a wireless radio link.

4. The apparatus of claim 1, wherein said computer is a desk top unit and the computer communication means is a telephone modem.

5. The apparatus of claim 1, wherein said interface circuits are cables having connectors which match a video output port, a cursor control port and a keyboard port for each of the plurality of computer servers.

6. The apparatus of claim 1, wherein said plurality of multiplexers and said computer interface is mounted in a rack cabinet containing a plurality of computer servers.

7. The apparatus of claim 2, further comprising a means for supporting said computer in a rack cabinet containing a plurality of computer servers.

8. The apparatus of claim 7, wherein the supporting means is a shelf that stores in the rack cabinet and extends out from the rack cabinet so that said computer is supported thereon.

9. The apparatus of claim 8, further comprising a portable printer connected to said computer and supported on the shelf.

10. The apparatus of claim 8, wherein a part of the shelf is adapted as a flat surface for writing or supporting papers thereon.

11. The apparatus of claim 2, further comprising a means for mounting and storing said computer in a rack cabinet containing a plurality of computer servers.

12. The apparatus of claim 11, wherein said mounting and storage means is a shelf that stores in the rack cabinet and extends out from the rack cabinet with said computer attached thereto.

13. The apparatus of claim 12, wherein said computer is removably attached to the shelf.

14. The apparatus of claim 11, wherein said mounting and storage means is a pair of rack slides that stores in the rack cabinet and extends out from the rack cabinet with said computer attached thereto.

15. The apparatus of claim 11, wherein said mounting and storage means has a handle for moving it in and out of the rack cabinet.

16. The apparatus of claim 11, further comprising:

a latch for holding said mounting and storage means in the rack cabinet when stored therein; and a means for urging said mounting and storage means out of the rack cabinet when said latch is released;

wherein said urging means is mechanically charged when said mounting and storage means is pushed back into the rack cabinet.

17. The apparatus of claim 16, wherein said urging means is a spring.

18. The apparatus of claim 16, wherein said urging means is a piston in a cylinder containing a compressible gas.

19. The apparatus of claim 12, further comprising:

a motor driven actuator for moving said shelf in and out of the rack cabinet; and a control means for causing said motor driven actuator to move the shelf in and out of the rack cabinet.

20. The apparatus of claim 19, further comprising limit switches for determining when said shelf is fully in and out of the rack cabinet.

21. The apparatus of claim 2, wherein said computer communication means is a hot pluggable connection.

22. The apparatus of claim 2, wherein said computer communication means is a wireless infrared data link.

23. The apparatus of claim 2, wherein said computer communication means is a wireless radio link.

24. The apparatus of claim 2, further comprising a touch screen control with the computer video display for selecting menu options on the video display.

25. The apparatus of claim 2, further comprising voice selection of menu options on said computer video display.

26. The apparatus of claim 2, further comprising a second video display for displaying the same information that is on said computer video display.

27. The apparatus of claim 2, wherein a graphical user interface is used to display information on said computer video display.

28. A system for administering and maintaining a plurality of computer servers, said system comprising:

a plurality of computer servers mounted in a rack cabinet, each of the plurality of computer servers having a video output, and keyboard and cursor control inputs;

an administrator unit, said administrator unit having a flat panel video display, keyboard, means for cursor control, and a first communications interface, wherein the video display and keyboard are hinged at a common edge and fold together when not in use;

an interface unit, said interface unit having a plurality of video inputs, a plurality of keyboard outputs, a plurality of cursor control outputs, and a second communications interface;

wherein each of the plurality of computer servers has its video output, keyboard input and cursor control input connected to a respective one of the plurality of video inputs, the plurality of keyboard outputs and the plurality of cursor control outputs of said interface unit, whereby said interface unit selects any one of the plurality of computer servers and translates the video output, keyboard input and cursor control input of the selected one of the plurality of computer servers into a data format to be used with said administrator unit over the first and second communications interfaces;

a movable holder attached to the rack cabinet and said administrator unit, wherein said movable holder supports said administrator unit in front of the rack cabinet when in an extended first position and stores said administrator unit in the rack cabinet when in a retracted second position; and a communications circuit for connecting the first and second communications interfaces together.

29. The system of claim 28, wherein said administrator unit is a portable notebook computer.

30. The system of claim 28, wherein said administrator unit is removably attached to said movable holder.

31. The system of claim 28, wherein said administrator unit is controlled by a software program having a graphical user interface displayed on the flat panel video display of said administrator unit.

32. The system of claim 31, wherein said interface unit is controlled by menu selections of the software program displayed on the flat panel video display of said administrator unit.

33. The system of claim 28, wherein said interface unit is mounted in the rack cabinet.

34. The system of claim 28, further comprising a handle for moving said movable holder in and out of the rack cabinet.

35. The system of claim 28, further comprising:

a latch for holding said movable holder in the rack cabinet when stored therein; and a means for urging said movable holder out of the rack cabinet when said latch is released;

wherein said urging means is mechanically charged when said movable holder is pushed back into the rack cabinet.

36. The system of claim 35, wherein said urging means is a spring.

37. The system of claim 35, wherein said urging means is a piston in a cylinder containing a compressible gas.

38. The system of claim 28, further comprising:

a motor driven actuator for moving said movable holder in and out of the rack cabinet; and a control means for causing said motor driven actuator to move said movable holder in and out of the rack cabinet.

39. The system of claim 28, wherein said communications circuit is a hot pluggable connection.

40. The system of claim 28, wherein said communications circuit is a wireless infrared data link.

41. The system of claim 28, wherein said communications circuit is a wireless radio link.

42. The system of claim 28, further comprising a touch screen control on the video display of said administrator unit for selecting menu options thereon.

43. The system of claim 28, further comprising voice selection of menu options on the video display of said administrator unit.

44. A system for administering and maintaining a plurality of computer servers, said system comprising:

a plurality of computer servers mounted in a plurality of rack cabinets, each of the plurality of computer servers having a video output, and keyboard and cursor control inputs;

an administrator unit, said administrator unit having a video display, keyboard, means for cursor control, and a first communications interface;

a plurality of interface units, each of said plurality of interface units having a plurality of video inputs, a plurality of keyboard outputs, a plurality of cursor control outputs, and a second communications interface;

wherein each of the plurality of computer servers mounted in one of the plurality of rack cabinets has its video output, keyboard input and cursor control input connected to a respective one of the plurality of video inputs, the plurality of keyboard outputs and the plurality of cursor control outputs of a one of said plurality of interface units, whereby the one of said plurality of interface units selects any one of the plurality of computer servers in the rack cabinet and translates the video output, keyboard input and cursor control input of the selected one of the plurality of computer servers into a data format to be used with said administrator unit over the first and second communications interfaces; and a communications circuit for connecting the first and second communications interfaces together.

45. The system of claim 44, wherein some of the plurality of rack cabinets are in locations different from some others of the plurality of rack cabinets.

46. The system of claim 44, wherein said communications circuit is a cellular radio.

47. The system of claim 44, wherein said communications circuit is a spread spectrum radio.

48. The system of claim 44, wherein said communications circuit is a telephone modem.

49. A method for administering and maintaining a plurality of computer servers, said method comprising the steps of:

connecting a multiplexer having video inputs, keyboard outputs and cursor control outputs to video outputs, keyboard inputs and cursor control inputs, respectively, of a plurality of computer servers mounted in a rack cabinet, wherein the multiplexer selects the video output, keyboard input and cursor input for each of the plurality of computer servers, selecting one of the plurality of computer servers with the multiplexer;

converting the selected video output, keyboard input and cursor input from the selected one of the plurality of computer servers to a bidirectional digital data format that is compatible with a computer used for administration and maintenance of the plurality of computer servers;

communicating the bidirectional digital data format to the administration and maintenance computer;

controlling the selection of the multiplexer with menu screens on a video display of the administration and maintenance computer; and administering the selected one of the plurality of computer servers with the administration and maintenance computer.

50. The method of claim 49, wherein the step of selecting the one of the plurality of computer servers with the multiplexer is done through a menu on a graphical user interface screen of the administration and maintenance computer.

51. The method of claim 49, further comprising the step of storing the administration and maintenance computer in the rack cabinet.

52. The method of claim 51, wherein the step of storing the administration and maintenance computer in the rack cabinet comprise the steps of:

folding a flat panel video display over a keyboard of the administration and maintenance computer so that the computer has a minimal height; and inserting the computer mounted on a sliding support into the rack cabinet.

53. The method of claim 52, further comprising the step of latching the computer when in the stored position.

54. The method of claim 52, further comprising the step of charging an urging means when the computer is placed into the stored position.

55. The method of claim 54, wherein the charged urging means pushes the computer out of the stored position in the rack cabinet and into a working position.

56. The method of claim 49, wherein the step of communicating is done with a hot pluggable connection between the rack cabinet and the computer.

57. The method of claim 49, wherein the step of communicating is done with a wireless infrared beam between the rack cabinet and the computer.

* * * * *